United States Patent [19]

Gerstenmeier et al.

[11] 3,976,860

[45] Aug. 24, 1976

[54] METHOD AND ARRANGEMENT FOR CONVERSION OF A DIGITAL MEASURED VALUE

[75] Inventors: Jurgen Gerstenmeier, Waldhilsbach; Wolfgang Korasiak, Ketsch; Thomas Morath, Heidelberg; Hans Muller, Sandhausen, all of Germany

[73] Assignee: Teldix GmbH, Heidelberg, Germany

[22] Filed: Aug. 7, 1975

[21] Appl. No.: 602,673

[30] Foreign Application Priority Data
Aug. 8, 1974 Germany............................ 2438273

[52] U.S. Cl. ............................ 235/151.3; 303/21 P; 235/156
[51] Int. Cl.² ...................... G06F 15/34; B60T 8/12
[58] Field of Search............. 235/151.3, 156, 150.2; 303/21 P, 21 CF, 21 CG; 307/233 B

[56] References Cited
UNITED STATES PATENTS

| 3,652,135 | 3/1972 | Baumann | 303/21 CF |
| 3,716,273 | 2/1973 | Beyeriein | 303/21 CG |
| 3,744,854 | 7/1973 | Ooya et al. | 303/21 CF X |
| 3,843,210 | 10/1974 | Portas et al. | 303/21 CG |

Primary Examiner—Edward J. Wise
Attorney, Agent, or Firm—Spencer & Kaye

[57] ABSTRACT

A method for the conversion of a constantly occurring measured value in digital form into a filtered digital value comprises comparing the instantaneous measured value with a digital value determined by previous measurements, evaluating the difference $\Delta$ of the values in accordance with a predetermined function $K = f(\Delta)$ and adding this evaluated value, correct with respect sign, to the said digital value determined by previous measurements.

The invention also includes an arrangement suitable for carrying out this method.

22 Claims, 1 Drawing Figure

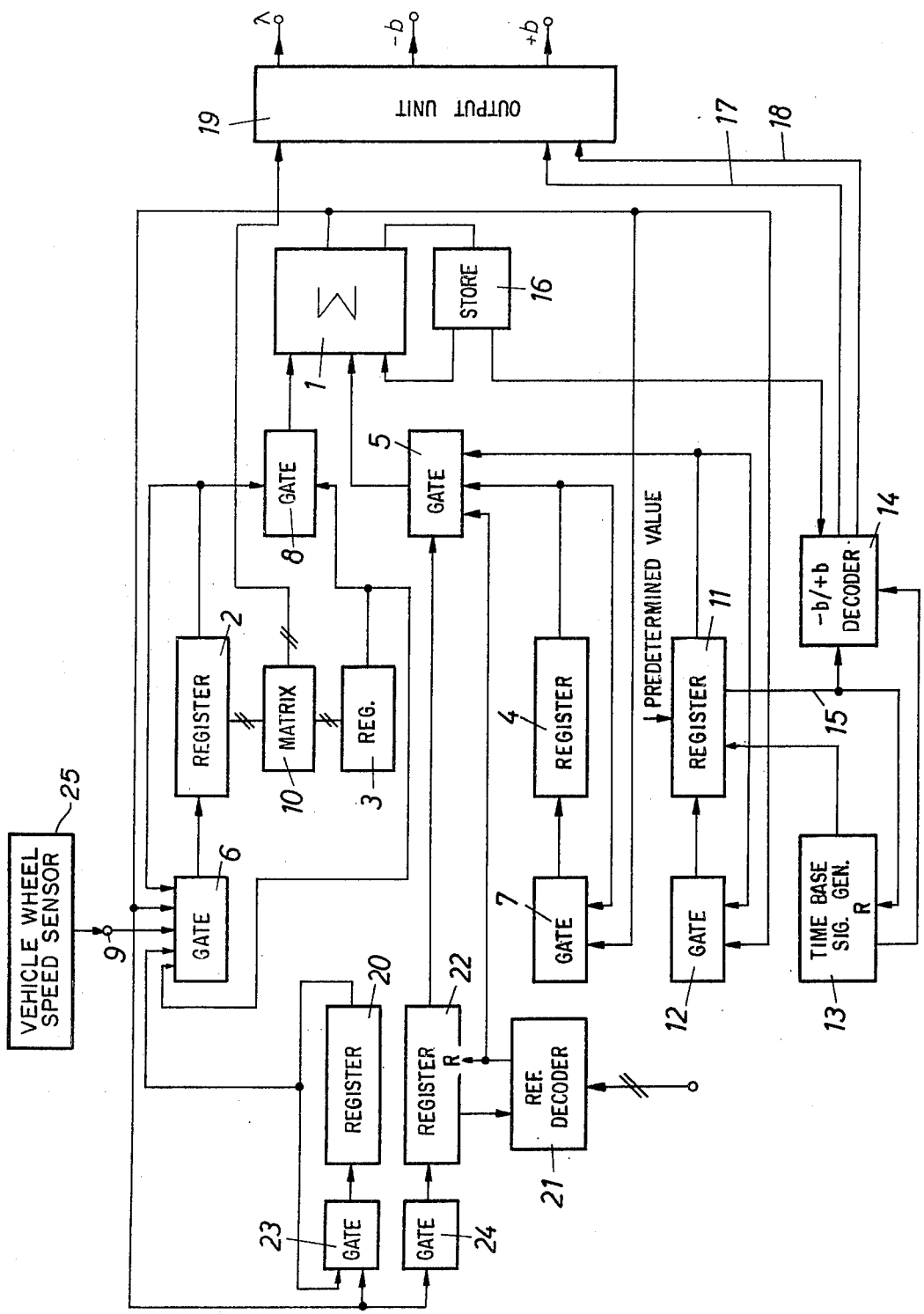

METHOD AND ARRANGEMENT FOR CONVERSION OF A DIGITAL MEASURED VALUE

BACKGROUND OF THE INVENTION

The invention relates to a method for the conversion of a constantly occurring measured value, present in digital form, into a filtered digital value. An arrangement suitable for carrying out the method as well as further processing of the filtered value are also included in the present invention.

It is known to filter measured values, which can have transient disturbances superimposed on them, in order to prevent switching operations being wrongly tripped by these disturbances. Thus, for example, such a filtering must be used in the measuring of the speed of vehicle wheels if the measured speed is to be used for brake pressure control. Otherwise, a short disturbance, for example, a large wheel slip or a large wheel deceleration, can be simulated and a brake pressure reduction could be wrongly triggered. A timing element is usually used for filtering in analog systems.

SUMMARY OF THE INVENTION

It is an object of the invention to create a favourable method and arrangement for the conversion of a digital measured value into a filtered digital value.

According to a first aspect of the invention, there is provided a method for the conversion of a constantly occurring measured value in digital form into a filtered digital value, comprising the steps of comparing the instantaneous measured value with a digital value determined by previous measurements, evaluating the difference of the two comparison values in accordance with a predetermined conversion function and adding the evaluated value correct with respect to sign, to said digital value determined by previous measurements.

According to a second aspect of the invention, there is provided an arrangement for the conversion of a constantly occurring measured value in digital form into a filtered digital value comprising comparison means for comparing the instantaneous measured value with a digital value determined by previous measurements, evaluating means for evaluating the difference of the comparison values in accordance with a predetermined conversion function and adding means for adding the evaluated value, correct with respect to sign, to said digital value determined by previous measurements.

BRIEF DESCRIPTION OF THE DRAWINGS

The invention will now be described in greater detail by way of example with reference to the drawing, the single FIGURE of which shows a block diagram of an arrangement in accordance with the invention.

DESCRIPTION OF THE PREFERRED EMBODIMENTS

The invention basically proposes a method for the conversion of a constantly occurring measured value in digital form into a filtered digital value in which the instantaneous measured value is compared with a digital value determined by previous measurements, the difference $\Delta$ of the two compared values is evaluated in accordance with a predetermined conversion function and the evaluated value $K = f(\Delta)$ is added, correct with respect to sign, to the digital value determined by previous measurements.

The invention also basically proposes an arrangement for the conversion of a constantly occurring measured value in digital form into a filtered digital value in which the arrangement comprises comparison means for comparing the instantaneous measured value with a digital value determined by previous measurements, evaluating means for evaluating the difference $\Delta$ of the comparison values in accordance with a predetermined conversion function and adding means for adding the evaluated value $K = f(\Delta)$, correct with respect to sign, to the digital value determined by previous measurements.

The correlation between $\Delta$ and $K$ is so selected that the filtered value follows the actual value in a delayed manner similarly to the situation occurring when using a timing element in the analog case. For example, in order to obtain $K$, $\Delta$ is divided by a number $n > 1$, particularly by 2, 4 or 8, since then only one, two or three places of the digital value have to be left out. Beyond a predetermined threshold of, for example, $\Delta > 7$ km/h, in the case of wheel speed measurements, every $\Delta$ value is converted into the same $K$ value thus providing a limiting value since larger values are not possible.

To determine the change of the filtered value per time unit, — in the case of the measurement of the wheel slip, the wheel acceleration or deceleration is determined —, in the case of the filtering method in accordance with the invention, it is merely necessary to add up the sequentially determined $K$ values during a predetermined time period and to compare this sum value with a comparison value. If the comparison value is achieved within the time period, then the change, for example, acceleration or deceleration, is too large and a switch signal is produced, for example for maintaining the brake pressure constant or for reducing the brake pressure. The time period is restarted when the switch signal occurs.

If the comparison value is once reached indicating, for example, in the wheel speed measurement, that a predetermined wheel deceleration is exceeded, then it is advantageous if the predetermined time period is shortened and the comparison value is reduced correspondingly. In this case a quicker termination of the switch signal is achieved if in one of the following time periods the (new) comparison value is not reached because of the disappearance of the deceleration. On the other hand, however, only a large change can trip the switch signal, so that a faulty triggering by transient interferances is less probable. However, this situation represents additional filtering. In order to achieve an early termination of the switch signal with disappearance of the change of the measured value with respect to time, thus indicating the end of deceleration, it is continuously checked, in accordance with another embodiment of the invention, whether the $K$ value becomes 0 or whether its sign has changed during the time of a switch signal. If in some, for example four sequentially following determinations of $K$, this value is 0 or a value with the reverse sign, then this is used as the criterion for the termination of the switch signal.

In the case in which the filtered value indicates the speed of a vehicle wheel, a reference value approximating the vehicle speed can be formed from the filtered digital value by bringing the filtered value obtained during normal movement of the vehicle towards the instantaneous filter a value wherein the variation is determined from the rotary behaviour of the wheels existing in the exceptional circumstances present (a tendency to wheel locking and/or wheel spin of the wheels). Preferably a slow variation and a rapid variation are provided and these variations can be made operative both with positive and negative signs.

The reference value thus obtained can then be used to produce a slip signal, it being compared with the filtered digital value and, if it exceeds a predetermined threshold, a signal is produced. This signal is used for the brake pressure control and/or motor power control.

In one example of the invention, a signal derived from a vehicle wheel and present in digital form, is filtered in accordance with the invention, and a slip signal is obtained as well as signals indicating the wheel deceleration and/or acceleration. These signals should then be used for the control of the brake pressure at the vehicle wheels; it is thus a question of avoiding the danger of locking of the vehicle wheels. If necessary, the control of the motor power, in the sense of preventing wheel spin comes into consideration.

Referring to the drawings, in the embodiment shown, the filtering is carried out by means of adder 1 and a series of registers 2 to 4. Connected between the adder 1 and the registers, as well as also between the registers and the adder 1, are multiple gates 5 to 8, which are actuated by a central control circuit (which is not shown for the sake of clarity) and thus produce sequential connections between the adder and the registers and vice versa.

The measurement result — here the wheel speed generated by a vehicle wheel speed sensor 25 — appears at the terminal 9 in digital form. By actuation of the multiple gate 6 and the generation of a call-up pulse, this digital information is serially fed into the register 2. In a following pulse, the multiple gates 5 and 8 are so actuated that, on the one hand, the content of the register 4 — here the filtered measured value obtained from the preceding measurements and simultaneously the content of the register 2 passes to the adder 1 for the formation of a difference. Additionally, by switching through the multiple gate 7 the outgoing value of the register 4 is again fed into this register. The difference $\Delta$ determined in the adder 1 is then, inclusive of the encoded sign, written into the register 2 via the multiple gate 6. The stored digital value is then evaluated in a predetermined manner in a matrix 10; the resultant digital evaluated value K is written in in parallel into the register 3. Preferably, $K = \Delta/4$. Moreover, a limit is provided for higher $\Delta$ values. The matrix 10 is, in general, a digital divider which produces the output value $K = \Delta/n$, where n is a number greater than one, up to a given threshold value and thereafter maintains this output value K constant. Preferably n is equal to 2, 4 or 8 in which case, as is known in the art the digital dividing in the matrix 10 may simply be accomplished with a register in which the difference value $\Delta$ is introduced and an arrangement for shifting the content of the register by one, two or three places, respectively. In a next pulse the determined K value is added, correct with respect to sign, (using multiple gates 5 and 8) to the filtered measured value of the register 4 in the adder 1. The resultant new filtered value is again stored in the register 4 via multiple gate 7. It is the desired filtered value. After a pause in which the adder 1 is required for slip measurement and acceleration/deceleration determination, the entire process is repeated.

A register 11, a multiple gate 12, a time base signal generator 13 and a decoder 14 serve to determine the sheel acceleration or wheel deceleration. The time base signal generator 13 sets, the register 11 to a predetermined value, which can also be 0, at the beginning of a time period determined thereby. Now, in this time period whose duration is predetermined by the time base signal generator, and is large with respect to the period of the determination of the K value, always when a new K value has been determined, (which is then stored in the register 2 (via multiple gate 6)), this K value is added, correct with respect to sign, to the register content of the register 11 (via multiple gates 5, 8) and again fed into the register 11 (via multiple gate 12). In the case of the presetting of the register 11 to 0, only the K values occurring within the time period are added up. If the register content of the register 11 does not go beyond a certain predetermined threshold value before the end of the time period, then, at the end of the time period, merely a resetting of the register 11 to the initial value (0) and a new start of a K value addition takes place. If, during a measuring period, the sign of the register content 11 changes, then the time base and the register is reset to 0, and a new measuring period begins. However, if the sum of the K values exceeds a predetermined threshold value during the time period, then a signal is emitted on line 15, which signal, on the one hand, sets the time period to 0, thus permitting a restart, and, on the other hand, feeds a signal to the decoder 14. It must be further determined, in the decoder 14, whether the signal was caused by a wheel deceleration or by a wheel acceleration. This information is acquired by the decoder as a result of the setting of the store arrangement 16 associated with the adder, which store arrangement is set, on determination of the $\Delta$ value, in accordance with which of the compared values was greater at the start of the measurement and also takes into account whether a reversal has taken place during the measurement period. Then a deceleration or acceleration signal arrives at the output unit 19 on one of the two lines 17 or 18.

As already indicated above, the register 11 can be preset to a value A and the determined K values can be added, correct with respect to sign, to the preset value A. Here two threshold values should be provided, namely $A + x$ and $A - x$, wherein an acceleration signal is produced if $A + x$ is exceeded and a deceleration signal if $A - x$ is passed downwardly.

The deceleration signal and the acceleration signal lasts, — in the embodiment described till now-until one of the following time periods has completely elapsed, which only happens if the threshold was not exceeded before the end of the time period. The signal thus produced triggers a related control effect, e.g. a deceleration signal triggers a pressure reduction. If the deceleration of the wheel ends during a time period, the deceleration signal effecting the pressure reduction is only ended at the end of the time period. This pressure reduction then lasts too long.

In order to prevent this unwanted duration of the signal, the signal generator 13 can be switched to a shortened time base and simultaneously the threshold or thresholds can be switched over correspondingly in the register 11, as soon as the deceleration signal or even acceleration signal has occurred once. Thus, after the end of the acceleration or deceleration signal, only a short time period passes before the end of the corresponding control operations.

In accordance with another preferred arrangement, during each current time period it is checked whether, with a deceleration signal present, the K value or the Δ value for a preceding number of sequential measurements (e.g. four) becomes 0 or changes its sign. If this is the case, this is an indication that, for example, the deceleration is terminated. The deceleration signal is then also terminated. This check also occurs in the decoder 14.

In accordance with another form of embodiment of the invention the time period predetermined by the time base 13 and at whose end the deceleration signal is terminated, is prevented by the fact that with arising of a deceleration signal, every negative value fed into the register 11 (if the normal position of the register 11 is 0) resets the register 11 and the time base. As long as a deceleration is determined in an individual measurement, the time base is restarted. A positive K coming thereafter will, on the other hand, be stored in the register 11; because of this the register value, with a negative K value (smaller or equal to the positive K) following thereafter will not become negative again and therefore no resetting takes place. With this method it can be achieved that, at a deceleration 0 after a deceleration phase, and with a digital value moving backwards and forwards on account of a digital error/no interruption of the time base takes place, but that the time base can decay so that the switching signal terminates.

The register 20, in which there is, practically always a digital value corresponding to the filtered value of the register 4 during normal driving of the vehicle, serves for the formation of the reference value approximated to the vehicle speed. For this, the reference value of the register 20 is fed at predetermined intervals, via multiple gate 6, to the register 2 and from there via multiple gate 8 to the adder 1. The adder 1 adds one bit to the fed-in reference value, if a corresponding signal comes from the decoder 21 via multiple gate 5. One bit, for every feed-in of the reference value to the adder 1, is subtracted if a different signal arrives. The computing time and the feed frequency of the content of the register 20 should be so dimensioned that on addition or subtraction of 1 bit per feed-in of the computing value, a large increase occurs (e.g. corresponding to 10 g).

Under certain conditions, the increase will be made very much less, e.g. corresponding to 0.3 g. In this case, only at approximately every 30th. feed-in of the content of the register 20 to the adder 1 will one bit be added or subtracted. Register 22 which, together with the adder 1, adds up the number of inputs of the content of the register 20 into the adder 1 without bit addition or subtraction, serves for this. On achieving e.g. the 30th position, the register 22 reports this to the decoder 21 which then resets the register 22 and causes the addition or subtraction of one bit at the next input of the register content into the adder. Further different increases can be provided. Also the speeds of a plurality of vehicle wheels can be included in the reference value formation. An additional register would be necessary for each further, filtered wheel speed.

A criterion for a slow increase (0.3 g) of the reference value towards the larger filtered wheel value can be, for example, — positive slip at the driven wheels of two axles.

A slow reduction of the reference value is carried out for example, on the actuation of the brake light switch and simultaneous actuation of the brake pressure modulator (e.g. of the brake fluid inlet valve). Thus this takes effect with brake pressure control when slip is present.

On the other hand, on braking without valve actuation and on non-braking but at a smaller wheel speed value relative to the reference value, a rapid reduction of the reference value is carried out, while on braking and a wheel value which is large relative to the reference value, a rapid increase is necessary.

The reference value in 20 is finally compared, in a further computing operation in the adder 1, to the instantaneous filtered wheel value (via multiple gate 5) and the slip value obtained is fed into the register 2 via multiple gate 6. The reference value is, in this case, simultaneously fed into the register 22 via multiple gate 23. This gate also controls the takeover of the newly computed reference value. Similarly, the gate 24 is required in order to feed, after the appropriate correction (addition 1 bit) of the register content of the register 22, the content of the register 22 back again into the register 22.

The slip value of the register 2 is compared with a threshold value in the element 10 and, on exceeding the threshold, a slip signal for the brake pressure control is produced and is fed to the output unit 19.

It will be understood that the above description of the present invention is susceptible to various modifications changes and adaptations.

What is claimed is:

1. A method for the conversion of a constantly occurring measured value in digital form into a filtered digital value, comprising the steps of comparing the instantaneous measured value with a digital value determined by previous measurements, evaluating the difference of the two values in accordance with a predetermined conversion function to provide an evaluated value and adding the evaluated value, correct with respect to sign, to said digital value determined by previous measurements.

2. A method a defined in claim 1, and comprising selecting said conversion function to cause said filtered digital value to follow said measured value in a delayed manner.

3. A method as defined in claim 1, and comprising selecting said conversion function to provide an evaluated value which is the difference of said compared values divided by a number greater than one for values of said difference of said comparison values up to a predetermined value and which remains constant for difference values above said predetermined value.

4. A method as defined in claim 1, and comprising adding up said evaluated values determined sequentially over a predetermined time period, comparing the sum value with a predetermined comparison value and producing a switch signal when said sum value exceeds said comparison value with simultaneous restarting of said predetermined time period.

5. A method as defined in claim 4, and comprising shortening said predetermined time period and reducing said comparison value after said comparison value is first exceeded by said sum values.

6. A method as defined in claim 4, and comprising checking whether said evaluated values become zero or change their sign after the occurrence of said switch signal within said predetermined time period and terminating said switch signal on the occurrence of a predetermined number of sequentially following evaluated values which are zero or have a changed sign.

7. A method as defined in claim 4, wherein from the production of said switch signal which causes restarting of said predetermined time period and erasing of said the sum value, every new sum value with a negative sign again restarts the predetermined time period and erases the sum value.

8. A method as defined in claim 4 and comprising producing said instantaneous measured value from a wheel of a vehicle to produce a digital value corresponding to the wheel speed and the deceleration or acceleration of the wheel.

9. A method as defined in claim 1 and comprising producing said instantaneous measured value from a wheel of a vehicle to produce a digital value corresponding to the wheel speed.

10. A method as defined in claim 9, and comprising obtaining a reference value approximated to the speed of said vehicle from the filtered digital value corresponding to the wheel speed by varying the filtered value obtained during normal driving towards the instantaneous filtered value, with the variation-speed determined by the rotary behaviour of the wheels in the exceptional circumstances present.

11. A method as defined in claim 10, and comprising obtaining a slip signal for brake pressure control and/or motor power control from comparison of said reference value and said filtered value.

12. An arrangement for the conversion of a constantly occurring measured value in digital form into a filtered digital value comprising comparison means for comparing the instantaneous measured value with a digital value determined by previous measurements, means for evaluating the difference of the compared values in accordance with a predetermined conversion function to provide an evaluated value and adding means for adding the evaluated value, correct with respect to sign, to said digital value, determined by previous measurements.

13. An arrangement as defined in claim 12, wherein said comparison means comprises a comparison element for comparison of said instantaneous measured value with said previously determined digital value.

14. An arrangement as defined in claim 12, wherein said comparison means comprises an adder for forming a difference value from said instantaneous measured value and said previously determined digital value.

15. An arrangement as defined in claim 14, and comprising a register with parallel outputs for storing said difference value and a decoder network connected to the parallel outputs of said register for assigning a predetermined evaluated value to each possible difference value.

16. An arrangement as defined in claim 14, and comprising a register for storing said difference value and shift means for shifting the register content by a predetermined number of places corresponding to a division in accordance with said conversion function.

17. An arrangement as defined in claim 12, and comprising an adder for adding every evaluated value determined within a predetermined time period to a sum of said evaluated values determined previously within said predetermined time period, a register for storing the sum of said evaluated values and a time base signal generator connected to said register to erase the content of said register at the end of each predetermined time period.

18. An arrangement as defined in claim 17, and comprising a preset register forming said register to which said evaluated values are added in a manner correct with respect to sign and switch means connected to said preset register for producing a switch signal when the contents of said preset register reach at least a value different from the preset value by a predetermined threshold value.

19. An arrangement as defined in claim 17, and comprising switch means for determining the sign of said difference or said evaluated value and two outputs for said register for selectively producing a signal in dependence on the determined sign when the contents of said register reach a predetermined threshold value.

20. An arrangement as defined in claim 12, and comprising means for producing said instantaneous measured value from a wheel of a vehicle, an adder to which is fed at predeterminend chronological intervals a digital value representing a reference value approximated to the speed of said vehicle and switch means to which said adder is connected and causing one bit to be added to and/or subtracted from said reference value, in dependence on signals related to the rotary behaviour of a wheel or wheels of said vehicle, at each feeding of said reference value to said adder or at a predetermined multiples thereof.

21. An arrangement as defined in claim 20, and comprising further switch means for determining the number of additions of said reference value during which no bit is added.

22. An arrangement as defined in claim 12, and comprising means for producing said instantaneous value from a wheel of a vehicle, an adder for forming a difference value between a reference value approximating to the speed of said vehicle and said filtered value and switch means connected to said adder for producing a switch signal on exceeding at least one predetermined difference value.

* * * * *